United States Patent
Laster

(10) Patent No.: US 9,829,573 B2
(45) Date of Patent: Nov. 28, 2017

(54) SONAR AUTO DEPTH RANGE

(71) Applicant: Navico Holding AS, Egersund (NO)

(72) Inventor: Matthew Laster, Broken Arrow, OK (US)

(73) Assignee: Navico Holding AS, Egersund (NO)

( * ) Notice: Subject to any disclaimer, the term of this patent is extended or adjusted under 35 U.S.C. 154(b) by 246 days.

(21) Appl. No.: 14/803,302

(22) Filed: Jul. 20, 2015

(65) Prior Publication Data
US 2017/0023669 A1 Jan. 26, 2017

(51) Int. Cl.
G01S 7/58 (2006.01)
G01S 15/89 (2006.01)
G01S 15/96 (2006.01)
G06T 11/20 (2006.01)
G01S 7/62 (2006.01)
G01S 15/88 (2006.01)
G01S 15/02 (2006.01)
G01S 7/00 (2006.01)

(52) U.S. Cl.
CPC .............. *G01S 7/58* (2013.01); *G01S 7/6218* (2013.01); *G01S 15/88* (2013.01); *G01S 15/89* (2013.01); *G01S 15/96* (2013.01); *G06T 11/206* (2013.01); *G01S 7/003* (2013.01); *G01S 15/025* (2013.01)

(58) Field of Classification Search
CPC .......... G01S 15/96; G01S 15/87; G01S 7/003; G01S 15/88; G01S 7/58; G01S 15/89; G01S 15/205; G01S 7/6218; G06T 11/206
See application file for complete search history.

(56) References Cited

U.S. PATENT DOCUMENTS

| | | | |
|---|---|---|---|
| 4,096,484 A | * | 6/1978 | Ferre .................. G01D 9/00 346/33 EC |
| 4,829,493 A | | 5/1989 | Bailey |
| 4,879,697 A | | 11/1989 | Lowrance et al. |
| 5,537,380 A | | 7/1996 | Sprankle, Jr. et al. |
| 6,084,565 A | | 7/2000 | Kiya |
| 6,411,283 B1 | | 6/2002 | Murphy |
| 6,909,946 B1 | | 6/2005 | Kabel et al. |
| 7,002,579 B2 | | 2/2006 | Olson |
| 7,236,426 B2 | | 6/2007 | Turner et al. |
| 7,607,022 B1 | | 10/2009 | Qiu et al. |

(Continued)

OTHER PUBLICATIONS

Customizing Workspaces; Adobe Audition Help—http://helpx.adobe.com/audition/using/customizing-workspaces.html; Apr. 11, 2011 (retrieved Jan. 24, 2015).

(Continued)

Primary Examiner — Gregory J Tryder
Assistant Examiner — Michael Le
(74) Attorney, Agent, or Firm — Nelson Mullins Riley & Scarborough LLP

(57) ABSTRACT

Various implementations described herein are directed to a non-transitory computer-readable medium having stored thereon a plurality of computer-executable instructions which, when executed by a computer, cause the computer to perform various actions. The actions may include receiving sonar data from a sonar transducer, identifying a subset of the received sonar data to be displayed on the screen, and identifying a deepest level from the subset. The actions may further include determining a depth range that includes the deepest level, and rendering an image of the subset based on the depth range.

20 Claims, 5 Drawing Sheets

(56) References Cited

U.S. PATENT DOCUMENTS

| | | |
|---|---|---|
| 7,890,867 B1 | 2/2011 | Margulis |
| 2002/0035574 A1 | 3/2002 | Dumas |
| 2003/0223733 A1 | 12/2003 | Chang |
| 2005/0163304 A1 | 7/2005 | Judkins et al. |
| 2006/0195495 A1 | 8/2006 | Asano |
| 2008/0192575 A1 | 8/2008 | Coleman |
| 2008/0204424 A1 | 8/2008 | Jin et al. |
| 2009/0064055 A1 | 3/2009 | Chaudhri et al. |
| 2009/0179789 A1 | 7/2009 | Haughay, Jr. et al. |
| 2009/0231953 A1* | 9/2009 | Welker ............... G01V 1/3835 367/19 |
| 2009/0249247 A1 | 10/2009 | Tseng et al. |
| 2010/0199225 A1 | 8/2010 | Coleman et al. |
| 2011/0004839 A1 | 1/2011 | Cha et al. |
| 2011/0013485 A1 | 1/2011 | Maguire |
| 2011/0025720 A1 | 2/2011 | Jo et al. |
| 2011/0154183 A1 | 6/2011 | Burns et al. |
| 2012/0001773 A1 | 1/2012 | Lyons et al. |
| 2012/0011437 A1 | 1/2012 | James et al. |
| 2012/0032974 A1 | 2/2012 | Lynch |
| 2013/0007665 A1 | 1/2013 | Chaudhri et al. |
| 2013/0021876 A1* | 1/2013 | Maguire ............... G01S 15/89 367/88 |
| 2013/0271301 A1 | 10/2013 | Kabel et al. |
| 2014/0010042 A1 | 1/2014 | Thomas et al. |
| 2014/0013270 A1 | 1/2014 | Thomas et al. |
| 2014/0013272 A1 | 1/2014 | Thomas et al. |
| 2014/0032479 A1* | 1/2014 | Lauenstein ....... G06F 17/30241 707/602 |
| 2014/0047379 A1 | 2/2014 | Urawaki et al. |

OTHER PUBLICATIONS

"Moom—Move and Zoom Windows"; http://manytricks.com/moom/; 2011 (retrieved Jul. 17, 2015).

"Grid Move"; http://www.pcworld.com/article/232975/gridmove.html; Feb. 25, 2010 (retrieved Jul. 17, 2015).

Resize Panel Groups; Adobe Soundbooth—http://help.adobe.com/en_US/Soundbooth/2.0/WSCFC3BDB7-C02D-4a3b-87B1-DB04C5D5E8C9.html; Apr. 26, 2007 (retrieved Jan. 24, 2015).

"5.12 Show Grid"; http://docs.gimp.org/en/gimp-view-show-grid.html; 2006 (retrieved 2015 Jul. 2017).

\* cited by examiner

SONAR AUTO DEPTH RANGE

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Displayed sonar data can be useful to fishermen, boat pilots and other users in marine environments. Users of sonar may be interested in viewing as much of the useful the collected data as possible. A sonar device that can detect depth and use detected depth to improve displayed sonar data can provide advantages to a boat pilot. Such advantages may include automatically displaying data with an appropriate depth range.

SUMMARY

Described herein are implementations of various technologies for a method of operating a sonar device. In one implementation, a non-transitory computer-readable medium having stored thereon a plurality of computer-executable instructions which, when executed by a computer, cause the computer to perform various actions. The actions may include receiving sonar data from a sonar transducer, identifying a subset of the received sonar data to be displayed on the screen, and identifying a deepest level from the subset. The actions may further include determining a depth range that includes the deepest level, and rendering an image of the subset based on the depth range.

Described herein are implementations of various technologies for a method of displaying sonar data on a screen. In one implementation, the method may include receiving sonar data from a sonar transducer, identifying a subset of the received sonar data to be displayed on the screen, and identifying a deepest level from the subset. The method may further include determining a depth range that includes the deepest level, and rendering an image of the subset based on the depth range.

Described herein are implementations of various technologies for an apparatus for displaying marine electronic navigation data. In one implementation, the apparatus may include one or more processors and a screen configured to display marine data. The apparatus may include a memory having a plurality of executable instructions which, when executed by the one or more processors, cause the one or more processors to perform various actions. The actions may include receiving sonar data from a sonar transducer, identifying a subset of the received sonar data to be displayed on the screen, and identifying from the subset a deepest level to be displayed on the screen. The actions may further include determining a depth range that includes the deepest level, and rendering an image of the subset of data based on the depth range.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Moreover, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1:
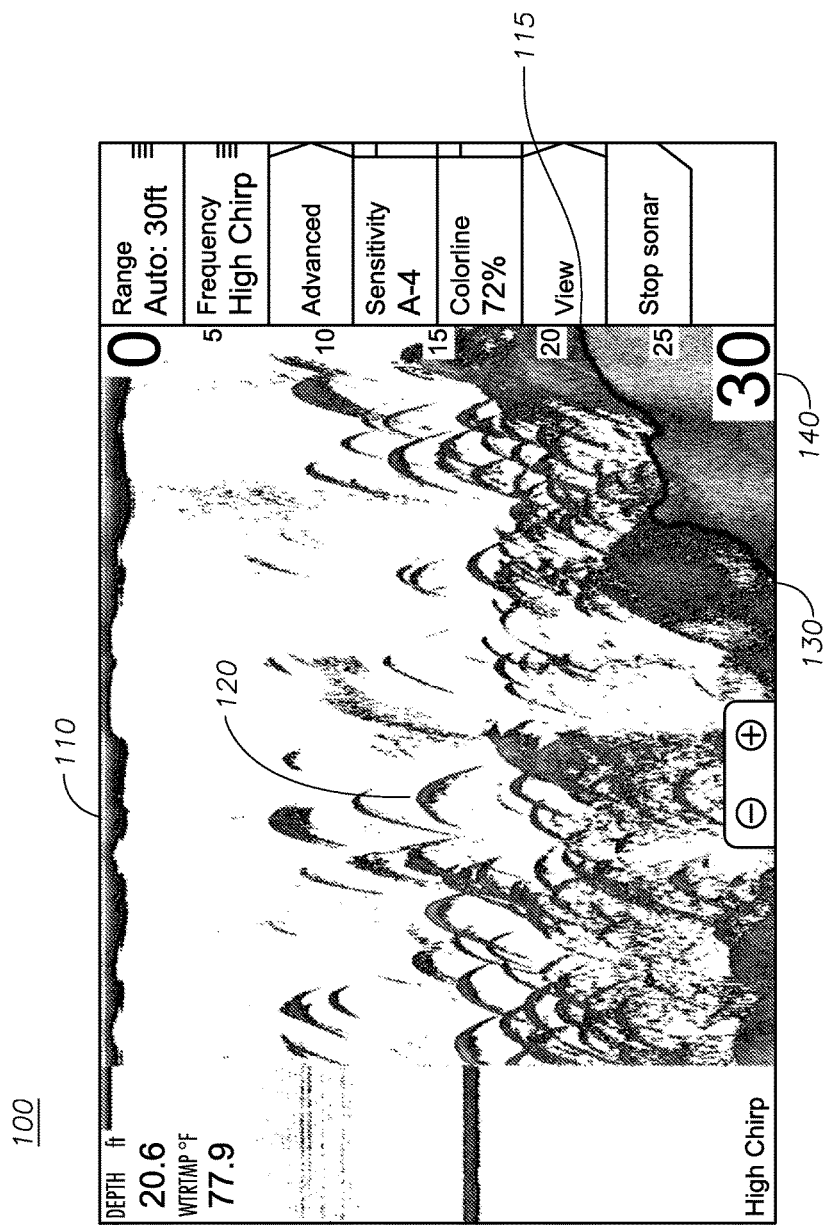
FIG. 1 illustrates a display of a sonar system in connection with various implementations described herein.

FIG. 1 illustrates a display 100 of a sonar system in connection with various implementations described herein. The sonar system display 100 may illustrate sonar data 110 received by a sonar device (not shown). The sonar data 110 may correspond to an underlying body of water in which the sonar device is deployed. The displayed sonar data 110 may be viewed by a user to determine the depth of the water, to show objects or formations in the water, or to recognize the presence of any fish in the water. The displayed sonar data 110 may include reflections 120 corresponding to one or more fish. The reflections 120 corresponding to the one or more fish may be in an arc shape. The sonar system display 100 may also illustrate the bottom 130 of a body of water (e.g., seabed or lake bottom), and any objects located on the bottom 130 of the body of water.

The sonar system display 100 may be a two-dimensional graphic, wherein the vertical axis represents depth and the horizontal axis represents time. The most recent sonar data 110 may be displayed to the right edge of the display 100, and older sonar data 110 may be displayed toward the left. As new sonar data 110 is received, it may replace the older sonar data 110, and the previously recorded sonar data 110 may appear to scroll from right to left on the sonar system display 100. Over time, as sonar data 110 is received, a representation of the bottom 130 of the body of water is displayed. Though the horizontal axis represents sonar data 110 received over time, if the sonar device collecting the sonar data 110 is in motion, the horizontal axis may also correspond space. For instance, the sonar data 110 displayed along the horizontal axis may correspond to terrain of the bottom 130 of the body of water along a path through which the sonar device has travelled.

The displayed depth range 140 of the data displayed is the deepest depth rendered on the sonar system display 100. Using conventional techniques, the displayed depth range 140 may be based on the most recently detected depth 115, which may be the depth detected from the most recently received sonar data 110 received. The displayed depth range may then be automatically adjusted to include the most recently detected depth 115. For example, as illustrated in FIG. 1, the data displayed on the far right of the display 100 is the most recently received sonar data 110. The most recently detected depth 115, which may be determined from the most recently received sonar data 110, corresponds to a depth of 20.6 feet. As illustrated, the depth range 140 displayed by the sonar system is 0 to 30 feet, i.e., this range includes the presently detected depth 115 of 20.6 feet.

The displayed depth range 140 allows for the entirety of the most recently received sonar data 110 to be displayed on the sonar display 100. However, this method has disadvantages. In some scenarios, the depth detected in the most recent sonar data 110 may not be the appropriate factor is selecting a depth to display for all the data that is visible on the sonar system display 100. For instance, the depth range of data displayed may be dynamic, such as where the sonar device is in motion through a path of varying depth. Further, where sonar data 110 shows depth that is decreasing with time, the depth detected in newer sonar data 110 will be less than that detected in older sonar data 110. Thus, if a depth range is determined based solely on newest sonar data 110, older data being displayed may be clipped, wherein the data on the deeper, or lower end of the complete available data is truncated and not displayed. There may often be useful information in these truncated parts of the older data. For instance, the truncated data may include reflections 120 showing fish, formations, changes in terrain, or other objects of interest on the bottom 130. Thus, various implementations described herein are directed to improved methods of automatically choosing displayed depth ranges.

Various implementations of automatic determination of depth shown on a sonar data display described herein will now be described in more detail with reference to FIGS. 2-5.

Figure 2:
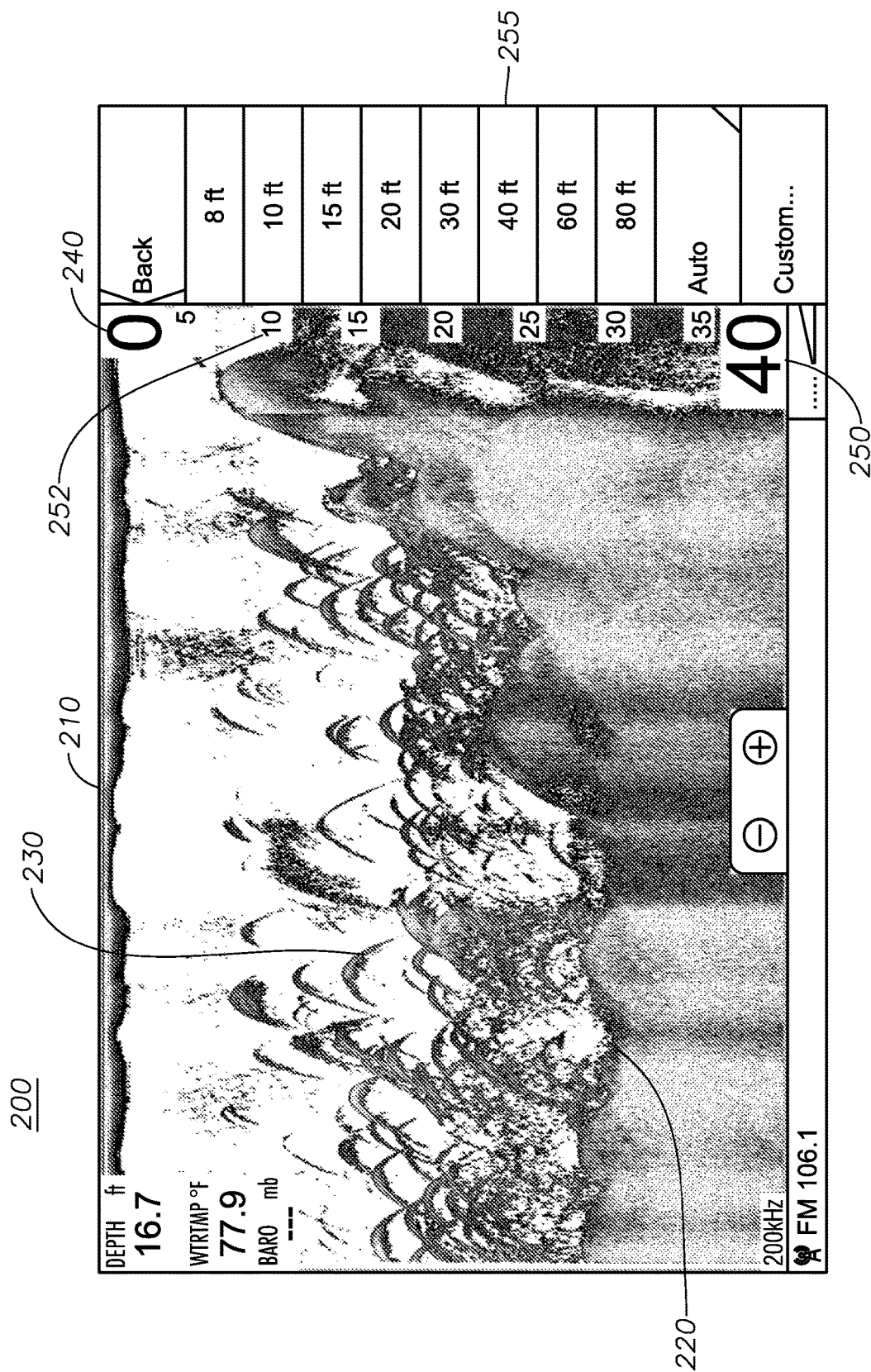
FIG. 2 illustrates a display of a sonar system in accordance with various implementations described herein.

FIG. 2 illustrates a display 200 of a sonar system in accordance with various implementations described herein. As in FIG. 1, the sonar system display 200 may illustrate sonar data 210 received by a sonar device such as a fishfinder or sounder. The sonar data 210 shown on the display 200 may allow a user to detect characteristics of or objects of interest within a body of water in which the sonar device is deployed. This information may be used for a variety of purposes such as establishing the depth of the water, or identifying any objects, marine life or formations in the water. The sonar system display 200 may additionally illustrate the bottom 220 of a body of water, and any objects located on the bottom 220 of the body of water. The sonar display 200 may also illustrate one or more fish, which may be displayed as arcs 230.

As in the sonar system display 100 of FIG. 1, the sonar system display 200 is a two-dimensional graphic, wherein the vertical axis represents depth and the horizontal axis represents time. The most recent sonar data 210 may be displayed to the right edge of the display 200. As time progresses and newer sonar data is received, older data may be replaced with the newer sonar data 210, and the older data 210 may move from the right to the left edge of the display. Over time, as sonar data 210 is received, a representation of the bottom 230 of the body of water in which the sonar device is deployed is displayed. When the sonar device is in motion, the horizontal axis may also correspond to a spatial representation over time of the area through which the sonar device has travelled.

In one implementation, the range of depth shown on the sonar display 200 may be determined based on the entire set of sonar data 210 that is currently displayed. In this manner, various techniques described herein allow the entire depth range of useful sonar data 210 to remain on the display 200 as long as sonar data 210 is being rendered on the display.

As shown, the most recent sonar data reveals a depth of 16.7 feet. If the sonar system display 200 were to use conventional techniques as illustrated in FIG. 1, the displayed depth range of the data would be one that merely includes 16.7 feet, such as a depth range of 0 to 20 feet, but may exclude useful data. As a consequence, in the present example, all older data to the left of the screen would be clipped at 20 feet. Any useful data occurring deeper than 20 feet, such as reflections 230 indicating the presence of fish occurring deeper than 20 feet, would be lost. Instead, according to various implementations described herein, the deepest depth reading taken from the entire set of displayed data is used to determine the range of data to be displayed. As illustrated in FIG. 2, though the newest data shows a depth of 16.7 feet, there is older data on the display having a deeper depth. In some present implementations, the displayed range automatically chosen and displayed by the system will be greater than the deepest depth among the sonar data displayed. In FIG. 2, the deepest depth of displayed data 210 is approximately 30 feet. Accordingly, the 0 to 40 feet range automatically determined and displayed may allow more of the available useful sonar data 210 to be displayed and viewed by a user.

In FIG. 2, the surface of the water, or a depth of zero, may be represented by the numeral zero 240 displayed at the top right hand corner of the displayed sonar data 210. The upper (deeper) end of the range of depth being displayed may be represented by a numerical value 250 displayed at the bottom right hand corner of the displayed sonar data. Intermediate depths, or increments may additionally be marked by display of their numerical values 252, tick marks, or tick labels to assist the user in estimating depth in the displayed data 210. The total range of depth 255 displayed may further be represented on a tab or window in a side menu.

In some implementations, the user may be provided an option to disable automatic depth display selection and manually select a depth displayed. In other implementations, the user may be provided an option to use various methods of automatic depth display. In yet other implementations, the sonar system may be set to automatically apply various methods of automatic depth display.

Figure 3:
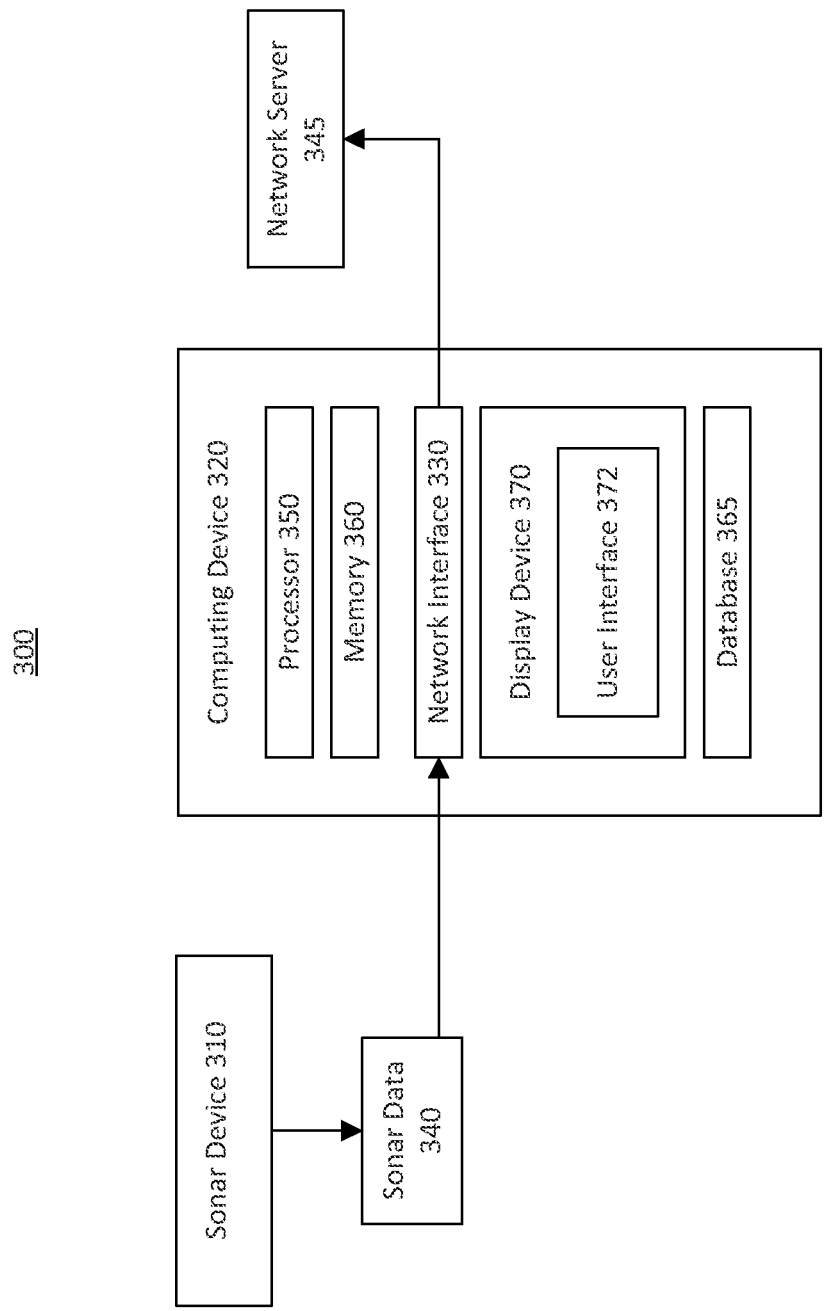
FIG. 3 illustrates a block diagram of a sonar system in accordance with implementations of various techniques described herein.

FIG. 3 illustrates a block diagram of a sonar system 300 in accordance with various implementations described herein. The sonar system 300 may include a number of different modules or components, each of which may comprise any device or means embodied in either hardware, software, or a combination of hardware and software configured to perform one or more corresponding functions. The sonar system 300 may include a sonar device 310 and a computing device 320. The computing device 320 may be a marine electronics device, MFD, smart phone, computer, laptop, tablet, etc. The computing device 320 may include a wireless network interface 330 for receiving transmitted sonar data 340. In one implementation, the network interface 330 may also include a mobile wireless internet interface, which may allow the user of the computing device 320 to access a network server 345 on the internet. The computing device 320 may include various computing, processing, and storage components, such as at least one processor 350 and memory 360. The memory 360 may include instructions that cause the processor 350 to receive and process the sonar data 340. In some implementations the memory 360 may include instructions that cause the processor 350 to determine the deepest depth from sonar data 340 to be displayed by the sonar device 310. Further, in some implementations the processor 350 may determine the depth range to be displayed by the sonar device 310. The processor 350 may store, record and/or log the sonar data 340 in one or more databases 365. The computing device 320 may be configured to store and record multiple data logs. In some implementations, the data logs may include data corresponding to the deepest depth associated with a given subset of sonar data 340, or to the depth range to be associated with a given subset of sonar data 340.

The computing device 320 may be configured to display data and/or various images, maps associated with the sonar data 340 on a display 370. The display 370 may further include a user interface 372. A user may enter commands and information into the computing device 320 using a user interface 372, through input devices such as touch screens. The user interface 372 may allow the user to adjust settings and/or configure one or more sonar devices 310 in real time. Further, the computing device 320 may be configured to upload the sonar data 340 and/or sonar log files to a network server 254 via the network interface 330. In some implementations, the computing device 320 may be configured to upload data corresponding to the depth range associate a subset of sonar data to at least one database via a network interface 330. The network server 345 may be a cloud server or other network server. Further, in some instances the computing device 320 may be configured to associate GPS positioning data to the data, data logs, images, maps etc., at any time, including prior to uploading to the network server 345. The GPS position information may be obtained from a GPS transceiver which may be encapsulated within the outer housing of the sonar device 310, and/or from a GPS transceiver located within the computing device 320.

The computing device 320 may be configured as a special purpose machine for interfacing with a sonar device 310. Further, the computing device 320 may include various standard elements and/or components, including the at least one processor 420, the memory 430 (e.g., non-transitory computer-readable storage medium), at least one database 470, power, peripherals, and various other computing components that may not be specifically shown in FIG. 2. Further, the computing device 320 may include the display device 460 (e.g., a monitor or other computer display) that may be used to provide a user interface 462, including a graphical user interface (GUI). The display 460 may be an incorporated part of the computing device 320. Alternatively, the display 460 may be implemented as a separate component. Further, the user interface 462 may be used to receive one or more preferences from a user of the display device 460 for managing or utilizing the sonar system 300, including altering the automatic depth display mode, or choosing a manual depth to display.

Various elements and/or components of the system 300 that may be useful for the purpose of implementing the system 300 may be added, included, and/or interchanged, in manner as described herein. For example, the computing device 320 may have built in functionality, and capabilities that may further assist the user while fishing. For example, the computing device 320 may have mobile wireless internet access. Mobile wireless internet access may allow a user to access weather forecasts, radar maps, tidal information, moon phases, sunrise and sunset calendars and the like.

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Generally, program modules include routines, programs, objects, components, data structures, etc. that perform particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may be implemented in the context of marine electronics, such as devices found in marine vessels and/or navigation systems. Ship instruments and equipment may be connected to the computing systems described herein for executing one or more navigation technologies. The computing systems may be configured to operate using various radio frequency technologies and implementations, such as sonar, radar, GPS, and like technologies.

The various technologies described herein may also be implemented in distributed computing environments where tasks are performed by remote processing devices that are linked through a communications network, e.g., by hard-wired links, wireless links, or combinations thereof. In a distributed computing environment, program modules may be located in both local and remote computer storage media including memory storage devices.

Figure 4:
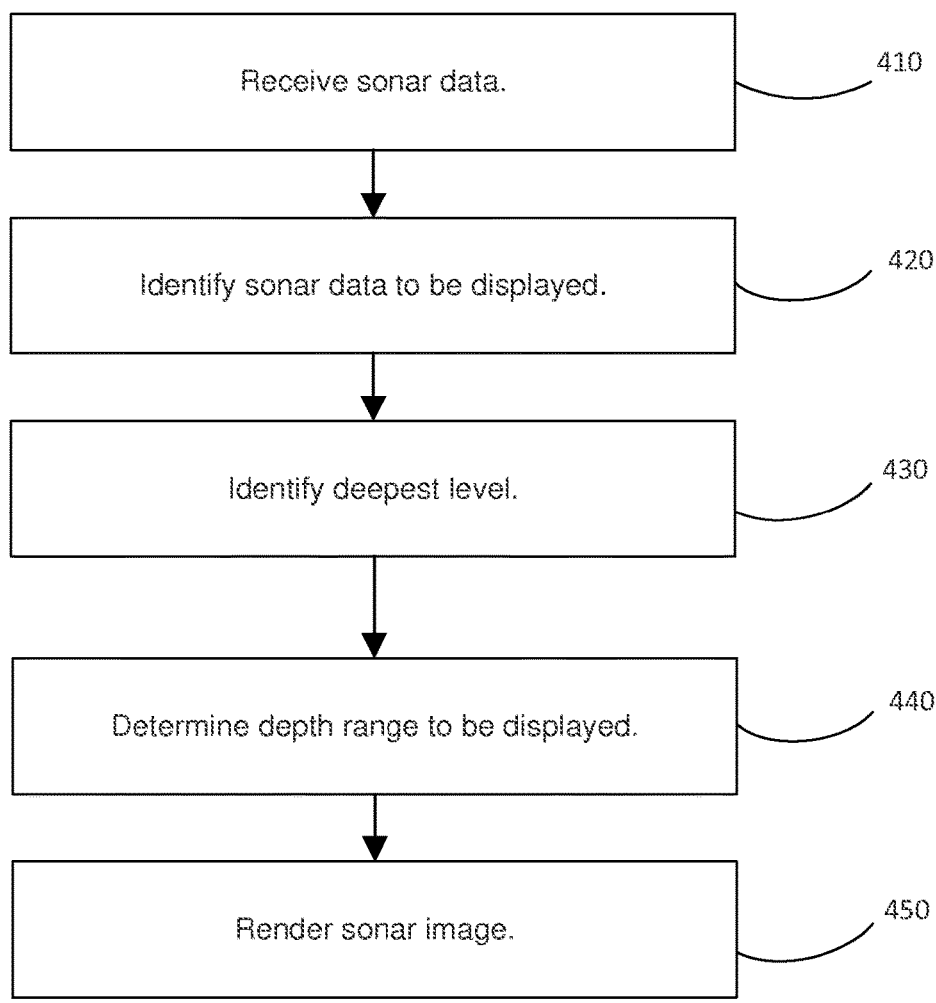
FIG. 4 illustrates a flow diagram of a method for acquiring, processing, and displaying sonar data in accordance with various implementations herein.

FIG. 4 illustrates a flow diagram of a method 400 for acquiring, processing, and displaying sonar data in accordance with various implementations herein. In one implementation, method 400 may be performed by any computing system, including a computing system like that referenced in FIG. 3, a portable computer system, a smart phone device, a remote server, a marine electronics device, a cloud server and the like. In some implementations, various portions of method 400 may be performed by the sonar device 310, also described in reference to FIG. 3. It should be understood that while method 400 indicates a particular order of execution of operations, in some implementations, certain portions of the operations might be executed in a different order, and on different systems. Further, in some implementations, additional operations or steps may be added to the method 400. Likewise, some operations or steps may be omitted. In one implementation, method 400 may be performed by one or more computer applications, where the computer applications may implement one or more of the steps described below.

At block 410, sonar data 340 may be received by a computing device. The collection of the sonar data 340 may be caused by the execution of instructions from the sonar device memory 360 and received by the sonar device processor 350. The collection of sonar data 340 may be initiated by a selection by the user communicated via the computing device and received at the sonar device 310 via the network interface. Alternatively, the collection of sonar data may be an automatic process initiated upon powering on the sonar device 310. In one implementation, the sonar device 310 may have a plurality of sonar transducer elements, e.g., a sonar transducer element which produces a conical beam, a down-scan sonar transducer element, which produces a trapezoidal beam directed in a downward direction, and a side-scan sonar transducer element which produces a trapezoidal beam directed in a sideways direction. In one scenario, sonar data 340 may be received from more than one transducer element simultaneously. In another implementation, the data collected may further include GPS data, time stamps, and camera data, as described above.

At block 420, the computing device processor 350 may identify a set of the sonar data 340 to be displayed on the display 370 of the computing device 320. This set may include the most recently received sonar data 340. In some implementations, the set to be displayed may not include the newest sonar data 340 and may instead include a set of historical data. The historical data may be selected by a user via the user interface 372. For instance, the selection may include a scroll or swipe of the sonar data 340 on the display 370. As such, the computing device 320 may receive a selection of historical sonar data that may not include the most current sonar data.

At block 430, the computing device processor 350 may identify the deepest level from the set or subset of sonar data 340 to be displayed. The identification may be completed by a comparison routine or algorithm stored in the memory 360 of the computing device 320. The identification may be preceded by processing to accurately identify the depths of the sonar data 340 within the set of data to be displayed.

At block 440, the computing device processor 350 may determine the depth range to be displayed. The depth range may include the deepest level identified at block 430. The depth range may be chosen from a predetermined set of depth ranges. For instance, the predetermined set may include the depth ranges of 0 to 5 feet/meters, 0 to 8 feet/meters, 0 to 10 feet/meters, 0 to 15 feet/meters, 0 to 20 feet/meters, 0 to 35 feet/meters, 0 to 40 feet/meters, 0 to 60 feet/meters, 0 to 80 feet/meters, and 0 to 100 feet/meters. In some implementations, the depth range displayed may be the smallest range that includes the deepest level.

At block 450, the sonar image of the set or subset of sonar data 340 may be rendered and displayed on the computing device display 370 based on the depth range determined at block 440. Method 400 may be repeated periodically upon the receiving of new sonar data 340. Blocks 430-450 may also be applicable to the selection of historical sonar data that may not include the most recent sonar data.

There may be a delay or other mechanism put into place to decrease demand on processing resources or to lower the frequency of changes in displayed depth range. For instance, a new depth range determination may not be used in the sonar image rendering unless the sonar data 340 passes a certain threshold. The sonar data 340 may be processed to ensure that any change in depth is significant or whether it should be ignored. Additionally, the sonar data 340 may be processed by the computing device processor 350 to accurately detect and identify objects of interest in the marine environment.

The sonar data 340 may be filtered to reduce interference or noise pollution from other noise sources. The sonar data 340 may also be processed to enhance the detection of fish. Likewise, the sonar data 340 may be processed such that a fisherman may be notified of the presence of fish or an object of interest in the marine environment by generation of an alarm.

The sonar data 340 may also be processed to enhance the identification of objects of interest within the marine environment. For instance, the sonar data 340 may be processed such that a depth can be assigned to the object of interest. Depth increments may be displayed on a screen with the corresponding processed sonar data 340.

The sonar data 340 may be processed so that a GPS location and/or time stamp may be assigned to sonar data 340 as it is received. GPS location may be assigned to the sonar data 340 while the sonar device 310 is being trolled through the water or at a given location. GPS positioning information may be used to superimpose the sonar data 340 onto a bathymetric chart or topographic map, thereby creating a sonar map of a marine environment. The GPS data files may have been obtained from a plurality of sonar devices 110 as they have been casted and/or trolled. The processing may also include synchronizing the sonar data 340 with sonar data 340 obtained from other sources, such as historical data logs, which may have been previously recorded by the user and/or obtained from other sources.

The sonar data 340 may further be processed to make it easier for the user to interpret, and distinguish between objects of interest in the marine environment. For example, various colors, symbols and/or icons may be assigned to different objects of interest identified in the marine environment. As another example, processing may include using interpolation, whereby interpolation of the sonar data 340 (point cloud) may enhance the contours and/or boundaries of an object of interest in the marine environment, thereby making it easier for a user to identify the object. The bottom topography depth contour of a lake, riverbed or seabed may be interpolated and/or shaded to make it easier for a user to visualize.

Figure 5:
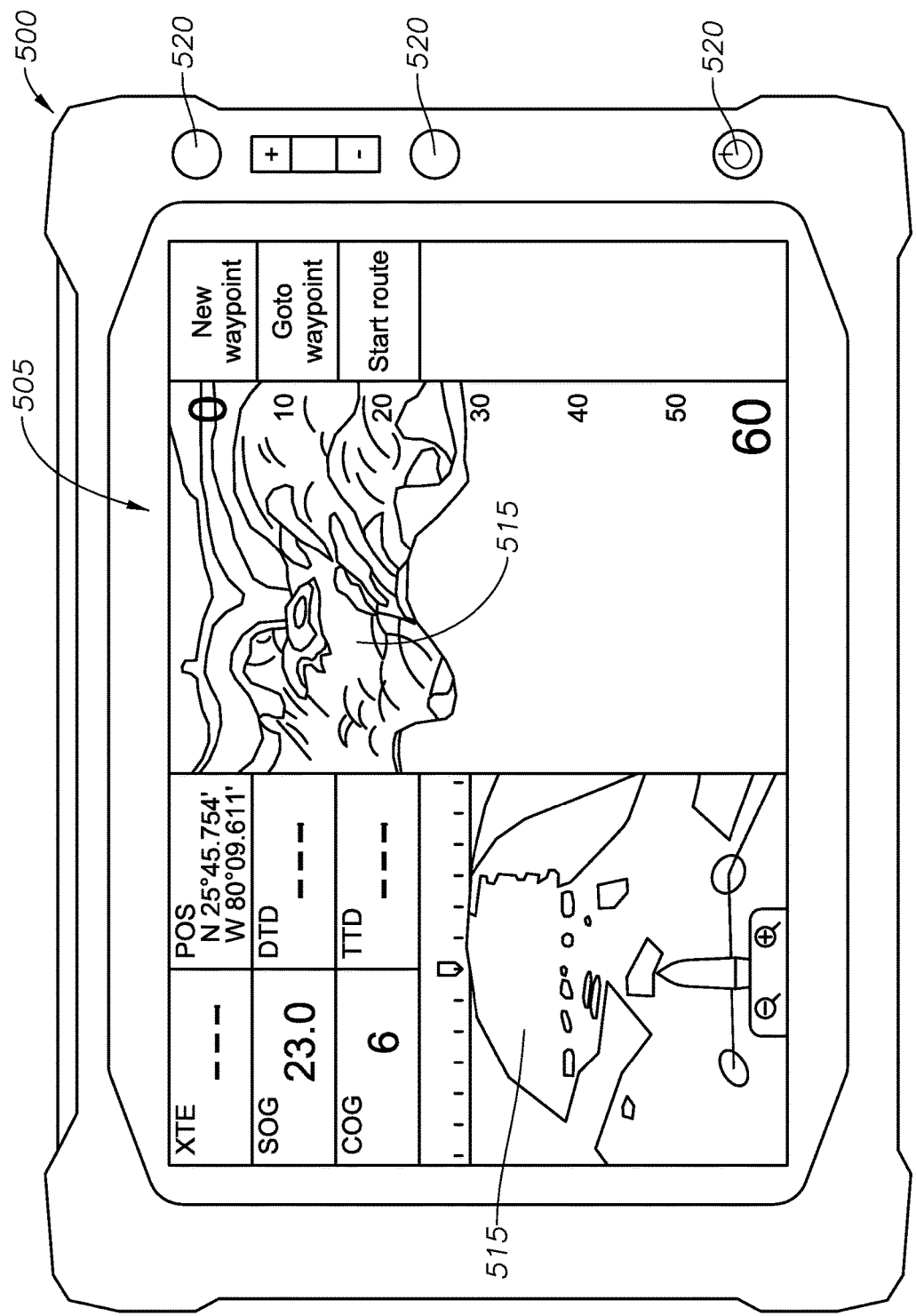
FIG. 5 illustrates a schematic of a marine electronics device in accordance with implementations of various techniques described herein.

FIG. 5 illustrates a schematic of a marine electronics device 500 in accordance with implementations of various techniques described herein. The marine electronics device 500 includes a screen 505. In certain implementations, the screen 505 may be sensitive to touching by a finger. In other instances, the screen 505 may be sensitive to the body heat from a finger, a stylus, or responsive to a mouse. The marine electronics device 500 may be attached to a National Marine Electronics Association (NMEA) bus or network. The marine electronics device 500 may send or receive data to or from another device attached to the NMEA 2000 bus. For example, the marine electronics device 500 may transmit commands and receive data from a motor or a sensor using an NMEA 2000 bus. In some implementations, the marine electronics device 500 may be capable of steering a vessel and controlling the speed of the vessel, i.e., autopilot. For instance, one or more waypoints may be input to the marine electronics device 500, and the marine electronics device 500 may be configured to steer the vessel to the one or more waypoints. Further, the marine electronics device 500 may be configured to transmit and/or receive NMEA 2000 compliant messages, messages in a proprietary format that do not interfere with NMEA 2000 compliant messages or devices, or messages in any other format. In various other implementations, the marine electronics device 500 may be attached to various other communication buses and/or networks configured to use various other types of protocols that may be accessed via, e.g., NMEA 2000, NMEA 0183, Ethernet, Proprietary wired protocol, etc.

The marine electronics device 500 may be operational with numerous general purpose or special purpose computing system environments and/or configurations. The marine electronics device 500 may include any type of electrical and/or electronics device capable of processing data and information via a computing system. The marine electronics device 500 may include various marine instruments, such that the marine electronics device 500 may use the computing system to display and/or process the one or more types of marine electronics data. The device 500 may display sonar data 340, for example, sonar and sensor data, and images associated with them. The marine electronic data types may include various chart data, radar data, sonar data 340, sensor data including environmental, steering, data, dashboard data, navigation data, fishing data, engine data, and the like. The marine electronics device 500 may include one or more buttons 520, which may include physical buttons or virtual buttons, or some combination thereof. The marine electronics device 500 may receive input through a screen 505 sensitive to touch or buttons 520. In some implementations, there may be a button 520 designated to trigger the use of the method 400 of automatic determination of depth range to be displayed as described in reference to FIG. 4.

The marine electronics device 500 may be configured to simultaneously display images associated with one or more sonar transducer elements, environmental sensors, and the like. In some implementations, the marine electronics device 500 may be configured to simultaneously display images associated with a plurality of sonar transducer elements, and the method 400 referenced in FIG. 4 may be implemented to automatically determine a preferred depth range to display for the multiple images. Further, the marine electronics device 500 may also be configured to simultaneously display images and/or data associated with various status indicators. For example, in some implementations, an alarm may be set to trigger when a certain depth level is encountered by the sonar device 310. In some instances, in various display modes of operation, the marine electronics device 500 may be configured to simultaneously display images and/or data associated with the marine environmental on the screen 505.

The marine electronics device 500 may be configured as a computing system having a central processing unit (CPU), a system memory, a graphics processing unit (GPU), and a system bus that couples various system components including the system memory to the CPU. In various implementations, the computing system may include one or more CPUs, which may include a microprocessor, a microcontroller, a processor, a programmable integrated circuit, or a combination thereof. The CPU may include an off-the-shelf processor such as a Reduced Instruction Set Computer (RISC), or a Microprocessor without Interlocked Pipeline Stages (MIPS) processor, or a combination thereof. The CPU may also include a proprietary processor.

The GPU may be a microprocessor specifically designed to manipulate and implement computer graphics. The CPU may offload work to the GPU. The GPU may have its own graphics memory, and/or may have access to a portion of the system memory. As with the CPU, the GPU may include one or more processing units, and each processing unit may include one or more cores.

The CPU may provide output data to a GPU. Further, the GPU may generate user interfaces, including graphical user interfaces (GUIs) that provide, present, and/or display the output data. The GPU may also provide objects, such as menus, in the GUI. In some instances, a user may provide input by interacting with objects, and the GPU may receive input from interaction with objects and provide the received input to the CPU. Further, in some instances, a video adapter may be provided to convert graphical data into signals for a monitor, such as, e.g., a multi-function display (MFD 500). The monitor (i.e., MFD 500) includes a screen 505. In various instances, the screen 505 may be sensitive to touch by a human finger, or the screen 505 may be sensitive to body heat from a human finger, a stylus, or responsive to a mouse.

The system bus may be any of several types of bus structures, including a memory bus or memory controller, a peripheral bus, and a local bus using any of a variety of bus architectures. By way of instance, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory may include a read only memory (ROM) and a random access memory (RAM). A basic input/output system (BIOS), containing the basic routines that help transfer information between elements within the computing system, such as during start-up, may be stored in the ROM.

The computing system may further include a hard disk drive interface for reading from and writing to a hard disk, a memory card reader for reading from and writing to a removable memory card, and an optical disk drive for reading from and writing to a removable optical disk, such as a CD ROM or other optical media. The hard disk, the memory card reader, and the optical disk drive may be connected to the system bus by a hard disk drive interface, a memory card reader interface, and an optical drive interface, respectively. The drives and their associated computer-readable media may provide nonvolatile storage of computer-readable instructions, data structures, program modules and other data for the computing system.

Although the computing system is described herein as having a hard disk, a removable memory card and a removable optical disk, it should be appreciated by those skilled in the art that the computing system may also include other types of computer-readable media that may be accessed by a computer. For instance, such computer-readable media may include computer storage media and communication media. Computer storage media may include volatile and non-volatile, and removable and non-removable media implemented in any method or technology for storage of information, such as computer-readable instructions, data structures, program modules, software modules, or other data. Computer-readable storage media may include non-transitory computer-readable storage media. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of instance, and not limitation, communication media may include wired media such as a wired network or direct-wired connection, and wireless media such as acoustic, radio frequency (RF), infrared (IR), and other wireless media. The computing system may include a host adapter that connects to a storage device via a small computer system interface (SCSI) bus, Fiber Channel bus, eSATA bus, or using any other applicable computer bus interface.

The computing system can also be connected to a router to establish a wide area network (WAN) with one or more remote computers. The router may be connected to the system bus via a network interface. The remote computers can also include hard disks that store application programs. In another implementation, the computing system may also connect to the remote computers via local area network (LAN) or the WAN. When using a LAN networking environment, the computing system may be connected to the LAN through the network interface or adapter. The LAN may be implemented via a wired connection or a wireless connection. The LAN may be implemented using Wi-Fi™ technology, cellular technology, Bluetooth™ technology, satellite technology, or any other implementation known to those skilled in the art. The network interface may also utilize remote access technologies (e.g., Remote Access Service (RAS), Virtual Private Networking (VPN), Secure Socket Layer (SSL), Layer 2 Tunneling (L2T), or any other suitable protocol). In some instances, these remote access technologies may be implemented in connection with the remote computers. It will be appreciated that the network connections shown are exemplary and other means of establishing a communications link between the computer systems may be used.

A number of program modules may be stored on the hard disk, memory card, optical disk, ROM or RAM, including an operating system, one or more application programs, and program data. In certain implementations, the hard disk may store a database system. The database system could include, for instance, recorded points. The application programs may include various mobile applications ("apps") and other applications configured to perform various methods and techniques described herein. The operating system may be any suitable operating system that may control the operation of a networked personal or server computer.

A user may enter commands and information into the computing system through input devices such as buttons, which may be physical buttons, virtual buttons, or combinations thereof. For example, the system may be configured to have a physical or virtual button dedicated to enabling of disabling the automatic depth display level capability of the computing device 320. Other input devices may include a microphone, a mouse, or the like (not shown). These and other input devices may be connected to the CPU through a serial port interface coupled to system bus, but may be connected by other interfaces, such as a parallel port, game port or a universal serial bus (USB).

Certain implementations may be configured for connection to a GPS receiver system and/or a marine electronics device or system. The GPS system and/or marine electronics device or system may be connected via a network interface. For instance, the GPS receiver system may be used to determine position data for the vessel on which the marine electronics device 500 is disposed. Further, the GPS receiver system may transmit position data to the marine electronics device 500. In other instances, any positioning system known to those skilled in the art may be used to determine and/or provide the position data for the marine electronics device 500.

The marine electronics device 500 may receive external data via a LAN or a WAN. In some implementations, external data may relate to information not available from various marine electronics systems. The external data may be retrieved from the Internet or any other source. The external data may include atmospheric temperature, atmospheric pressure, tidal data, weather, temperature, moon phase, sunrise, sunset, water levels, historic fishing data, and/or various other fishing data.

In one implementation, the marine electronics device 500 may be a multi-function display (MFD) unit, such that the marine electronics device 500 may be capable of displaying and/or processing multiple types of marine electronics data. FIG. 5 illustrates a schematic diagram of an MFD unit in accordance with implementations of various techniques described herein. In particular, the MFD unit may include the computing system, the monitor (MFD 500), the screen 505, and the buttons such that they may be integrated into a single console.

The discussion of the present disclosure is directed to certain specific implementations. It should be understood that the discussion of the present disclosure is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of the implementations and combinations of elements of different implementations within the scope of the claims. It should be appreciated that in the development of any such implementation, as in any engineering or design project, numerous implementation-specific decisions should be made to achieve a developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure. Nothing in this application should be considered critical or essential to the claimed subject matter unless explicitly indicated as being "critical" or "essential."

Reference has been made in detail to various implementations, examples of which are illustrated in the accompanying drawings and figures. In the following detailed description, numerous specific details are set forth to provide a thorough understanding of the present disclosure. However, the present disclosure may be practiced without these specific details. In other instances, well-known methods, procedures, components, circuits and networks have not been described in detail so as not to unnecessarily obscure aspects of the embodiments.

It should also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations and is not intended to limit the present disclosure. As used in the description of the present disclosure and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer-readable medium having stored thereon a plurality of computer-executable instructions which, when executed by a computer, cause the computer to:
   receive first sonar data from at least one sonar transducer of a vessel, wherein the first sonar data corresponds to a first position of the vessel on a body of water;
   identify a first subset of received sonar data to be displayed on the screen, wherein the first subset of the received sonar data includes a first subset of historical sonar data and the first sonar data;
   identify a first deepest depth level from the first subset of the received sonar data;
   determine a first depth range based on the first deepest depth level, wherein the first depth range includes the first deepest depth level;
   render a first image of the first subset of the received sonar data on the screen based on the first depth range, wherein the first image includes sonar data from the first subset of the received sonar data that is within the first depth range;
   receive second sonar data from the at least one sonar transducer of the vessel, wherein the second sonar data corresponds to a second position of the vessel on the body of water;
   identify a second subset of the received sonar data to be displayed on the screen, wherein the second subset of the received sonar data includes a second subset of the historical sonar data and the second sonar data, wherein the second subset of the historical sonar data includes the first sonar data;
   identify a second deepest depth level from the second subset of the received sonar data, wherein the second deepest depth level is different than the first deepest depth level;
   determine a second depth range based on the second deepest depth level, wherein the second depth range includes the second deepest depth level, wherein the second depth range is different than the first depth range; and
   render a second image of the second subset of the received sonar data on the screen based on the second depth range, wherein the second image includes sonar data from the second subset of the received sonar data that is within the second depth range.

2. The non-transitory computer-readable medium of claim 1, wherein the first depth range and second depth range are each selected from one of the following ranges: 0 to 5 feet, 0 to 8 feet, 0 to 10 feet, 0 to 15 feet, 0 to 20 feet, 0 to 35 feet, 0 to 40 feet, 0 to 60 feet, 0 to 80 feet, and 0 to 100 feet, and wherein the first depth range selected is the smallest range that includes the first deepest depth level and the second depth range selected is the smallest range that includes the second deepest depth level.

3. The non-transitory computer-readable medium of claim 1, wherein the computer-executable instructions further cause the computer to display the first deepest depth level or the second deepest depth level as a numerical value on the screen.

4. The non-transitory computer-readable medium of claim 1, wherein the computer-executable instructions further cause the computer to display an upper end of the first depth range or second depth range as a numerical value on the screen.

5. The non-transitory computer-readable medium of claim 1, wherein the computer-executable instructions further cause the computer to log the first depth range associated with the first subset of the received sonar data and the second depth range associated with the second subset of the received sonar data.

6. The non-transitory computer-readable medium of claim 1, wherein the computer-executable instructions further cause the computer to upload the first subset of the received sonar data and the first depth range and the second subset of the received sonar data and second depth range to at least one database via a network.

7. The non-transitory computer-readable medium of claim 1, wherein the computer executable instructions further cause the computer to:
   determine if the first deepest depth level is within a threshold from an average depth of the first subset of the received sonar data; and
   in an instance in which the first deepest depth level is outside of the threshold:
      identify, a third deepest depth level from the first subset of the received sonar data, wherein the third deepest depth level is within the threshold from the average depth of the first subset of the received sonar data; and
      determine the first depth range based on the third deepest depth level, wherein the first depth range includes the third deepest depth level.

8. A method of displaying sonar data on a screen, comprising:
   receiving, from at least one sonar transducer of a vessel, first sonar data, wherein the first sonar data corresponds to a first position of the vessel on a body of water;

identifying, using one or more processors, a first subset of received sonar data to be displayed on the screen, wherein the first subset of the received sonar data includes a first subset of historical sonar data and the first sonar data;

identifying a first deepest depth level from the first subset of the received sonar data;

determining a first depth range based on the first deepest depth level, wherein the first depth range includes the first deepest depth level;

rendering, on the screen, a first image of the first subset of the received sonar data based on the first depth range, wherein the first image includes sonar data from the first subset of the received sonar data that is within the first depth range;

receiving, from the at least one sonar transducer of the vessel, second sonar data, wherein the second sonar data corresponds to a second position of the vessel on the body of water;

identifying, using the one or more processors, a second subset of the received sonar data to be displayed on the screen, wherein the second subset of the received sonar data includes a second subset of the historical sonar data and the second sonar data, wherein the second subset of the historical sonar data includes the first sonar data;

identifying a second deepest depth level from the second subset of the received sonar data, wherein the second deepest depth level is different than the first deepest depth level;

determining a second depth range based on the second deepest depth level, wherein the second depth range includes the second deepest depth level, wherein the second depth range is different than the first depth range; and rendering, on the screen, a second image of the second subset of the received sonar data based on the second depth range, wherein the second image includes sonar data from the second subset of the received sonar data that is within the second depth range.

9. The method of claim 8, wherein the first depth range and the second depth range are each selected from one of the following ranges: 0 to 5 meters, 0 to 8 meters, 0 to 10 meters, 0 to 15 meters, 0 to 20 meters, 0 to 35 meters, 0 to 40 meters, 0 to 60 meters, 0 to 80 meters, and 0 to 100 meters, wherein the first depth range is the smallest range that includes the first deepest depth level and the second depth range selected is the smallest range that includes the second deepest depth level.

10. The method of claim 8, further comprising displaying at least one of the first deepest depth level or the second deepest depth level as a numerical value on the screen.

11. The method of claim 8, further comprising displaying an upper end of at least one of the first depth range or the second depth range as a numerical value on the screen.

12. The method of claim 8, further comprising logging the first depth range associated with the first subset of the received sonar data and the second depth range associated with the second subset of the received sonar data.

13. The method of claim 8, further comprising uploading the first subset of the received sonar data and the first depth range and the second subset of the received sonar data and the second depth range to at least one database via a network.

14. The method of claim 8, wherein the screen is the display of a marine electronics device.

15. An apparatus for displaying marine electronic navigation data, comprising:
one or more processors;
a screen configured to display marine data; and
memory having a plurality of executable instructions which, when executed by the one or more processors, cause the one or more processors to:
receive first sonar data from at least one sonar transducer of a vessel, wherein the first sonar data corresponds to a first position of the vessel on a body of water;
identify a first subset of received sonar data to be displayed on the screen, wherein the first subset of the received sonar data includes a first subset of historical sonar data and the first sonar data;
identify from the first subset of the received sonar data a first deepest depth level to be displayed on the screen;
determine a first depth range based on the first deepest depth level, wherein the first depth range includes the first deepest depth level;
render a first image of the first subset of the received sonar data based on the first depth range, wherein the first image includes sonar data from the first subset of the received sonar data that is within the first depth range,
receive second sonar data from the at least one sonar transducer of the vessel, wherein the second sonar data corresponds to a second position of the vessel on the body of water;
identify a second subset of the received sonar data to be displayed on the screen, wherein the second subset of the received sonar data includes a second subset of the historical sonar data and the second sonar data, wherein the second subset of the historical sonar data includes the first sonar data;
identify a second deepest depth level from the second subset of the received sonar data, wherein the second deepest depth level is different than the first deepest depth level;
determine a second depth range based on the second deepest depth level, wherein the second depth range includes the second deepest depth level, wherein the second depth range is different than the first depth range; and
render a second image of the second subset of the received sonar data on the screen based on the second depth range, wherein the second image includes sonar data from the second subset of the received sonar data that is within the second depth range.

16. The apparatus of claim 15, wherein the first depth range and the second depth range is selected from one of the following ranges: 0 to 5 feet, 0 to 8 feet, 0 to 10 feet, 0 to 15 feet, 0 to 20 feet, 0 to 35 feet, 0 to 40 feet, 0 to 60 feet, 0 to 80 feet, and 0 to 100 feet, wherein the first depth range is the smallest range that includes the first deepest depth level and the second depth range is the smallest range that includes the second deepest depth level.

17. The apparatus of claim 15, wherein the instructions further cause the one or more processors to display an upper end of the first depth range or second depth range as a numerical value on the screen.

18. The apparatus of claim 15, wherein the instructions further cause the one or more processors to log the first depth range associated with the first subset of data or the second depth range associated with the second subset of data.

19. The apparatus of claim 15, wherein the instructions further cause the one or more processors to upload the first subset of the received sonar data and the first depth range or the second subset of the received sonar data and the second depth range to at least one database via a network.

20. The apparatus of claim 15, wherein the instructions further cause the one or more processors to:
- determine if the first deepest depth level is within a threshold from an average depth of the first subset of the received sonar data; and
- in an instance in which the first deepest depth level is outside of the threshold:
  - identify, a third deepest depth level from the first subset of the received sonar data, wherein the third deepest depth level is within the threshold from the average depth of the first subset of the received sonar data; and determine the first depth range based on the third deepest depth level, wherein the first depth range includes the third deepest depth level.

\* \* \* \* \*